July 3, 1923.
H. BRANDENBERGER
1,460,640
METHOD AND MACHINE FOR PLANING HELICAL TEETH, MORE PARTICULARLY FOR BEVEL GEARS
Filed Jan. 5, 1921   3 Sheets-Sheet 1
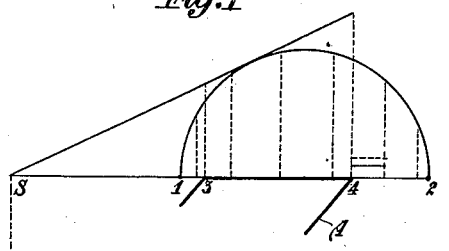
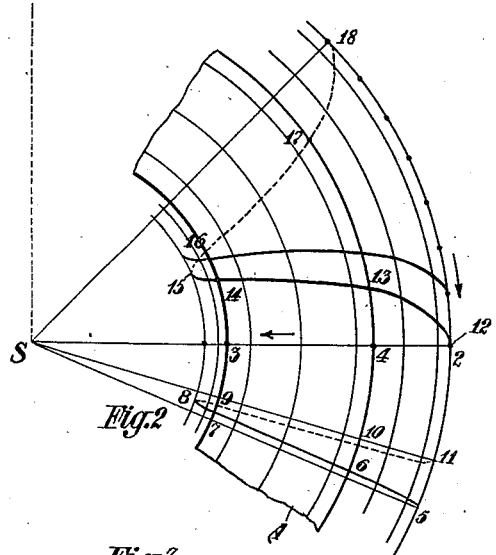
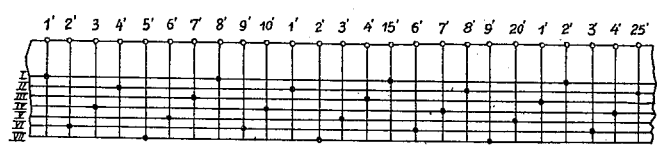
Inventor
H. Brandenberger,
By Marks & Clerk
Attys.

July 3, 1923. 1,460,640

H. BRANDENBERGER

METHOD AND MACHINE FOR PLANING HELICAL TEETH, MORE PARTICULARLY FOR BEVEL GEARS

Filed Jan. 5, 1921 3 Sheets-Sheet 2

Inventor
H. Brandenberger
By Marks & Clerk
Attorneys

July 3, 1923.

H. BRANDENBERGER 1,460,640

METHOD AND MACHINE FOR PLANING HELICAL TEETH, MORE PARTICULARLY FOR BEVEL GEARS

Filed Jan. 5, 1921    3 Sheets-Sheet 3

Inventor
H. Brandenberger
By Marks & Clerk
Attys.

Patented July 3, 1923.

1,460,640

UNITED STATES PATENT OFFICE.

HEINRICH BRANDENBERGER, OF VIENNA, AUSTRIA.

METHOD AND MACHINE FOR PLANING HELICAL TEETH, MORE PARTICULARLY FOR BEVEL GEARS.

Application filed January 5, 1921. Serial No. 435,268.

*To all whom it may concern:*

Be it known that I, HEINRICH BRANDENBERGER, a subject of the Republic of Switzerland, residing at 10 Degengasse, Vienna XVI, Austria, have invented certain new and useful Improvements in Methods and Machines for Planing Helical Teeth, More Particularly for Bevel Gears, of which the following is a specification.

In workshop practice, helical teeth can be formed on bevel wheels by planing, the bevel blank being given a regular rotation recurring at each stroke, while the cutting tool, likewise with a recurring regularity, moves to and fro in a straight line, during which, as when planing straight teeth, the line of motion of the point of the cutting edge of the tool passes through the apex of the cone. The rectilinear movement of the tool can be derived from a crank drive and is the same for two intermeshing gear wheels, the direction of rotation of the bevel blank being however reversed when cutting the mating gear wheel. The resulting path of the cut is thereby a relative motion of the cutting tool to the bevel blank. Such helical teeth have hitherto been cut in a manner whereby the rotary movement of the work has been utilized as a dividing motion, the cutting tool at each succeeding cut being allowed to cut the next tooth, whereby helical teeth with a very small spiral angle (skew) were obtained. In order to obtain teeth with larger spiral angles by this method, the work (bevel blank) had to be rotated further during the cut and rotated back again during the return of the cutting tool the amount of the excess rotation.

According to this invention this reverse rotation is avoided, in that the tool misses a number of pitch intervals whereby it is advisable to omit as many teeth as possible, in order to obtain a large inclination of the helical teeth. The rotation of the work is hereby a continuous one, capable of being a uniform or an irregular movement recurring at every stroke in accordance with the same law.

One feature of the invention consists in the method of planing helical teeth, more particularly for bevel gear wheels, wherein the ratio of the number of strokes of the cutting tool to the number of revolutions of the work is so proportioned, that the cutting tool misses one or more pitch intervals, whereby it is possible to form helical teeth with the greatest practicable inclination.

The helical shape of the teeth results in consequence of the relative movement of the tool to the bevel blank. The line of the relative movement encloses with the line of motion of the tool an angle varying according to the circumstances, the so-called spiral angle, which is dependent upon the number of pitch intervals which are missed at the time.

The invention relates further to a machine for planing helical teeth on bevel wheels, in which for different spiral angles one or two tool heads movable in tool slide guides, are, with the tools, capable of adjustment about an axis perpendicular to their lines of motion in the circle or circular arc in such a manner, that the direction of the tool position can be altered while the point of the cutting edge of the tool will always remain in the same place.

A constructional form of the invention is illustrated in the accompanying drawing.

Fig. 1 shows the stroke conditions of a typical stroke;

Fig. 2 the spirals generated by the cutting tool at the pitch cone, in the lower part of the figure in accordance with the known method and in the upper part in accordance with the method of the present invention; and Fig. 3 is a diagram.

Fig. 4 is a plan view,

Figure 4:
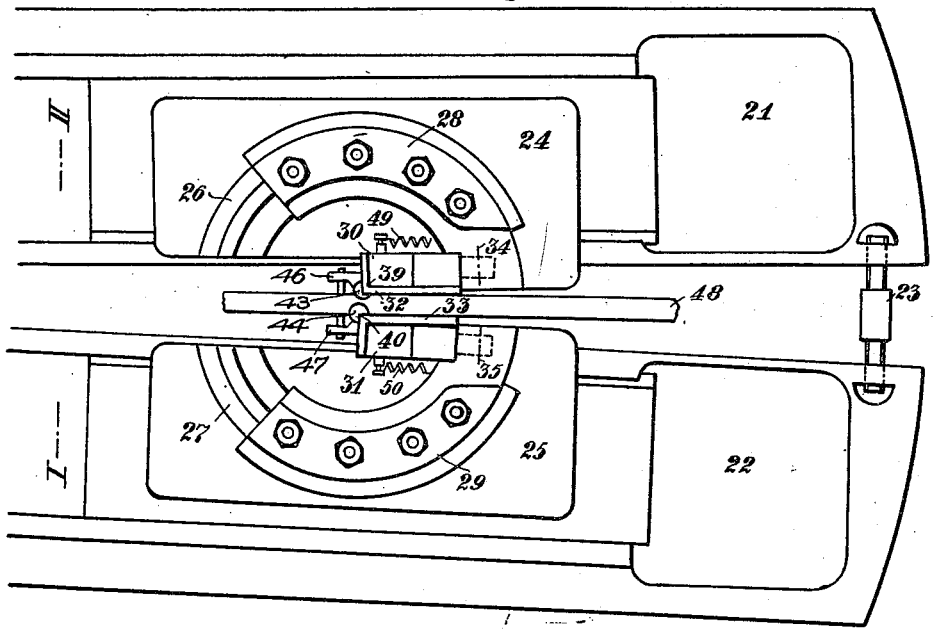
Figs. 4 to 6 illustrate the most essential part of the machine, the tool slide guide with the tool head arranged for two tools.
Figure 5:
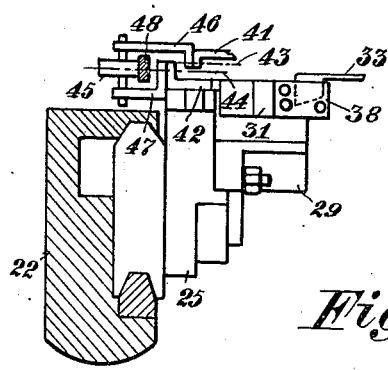

Fig. 5 a section taken along I—II in Fig. 4, and

Figure 7:
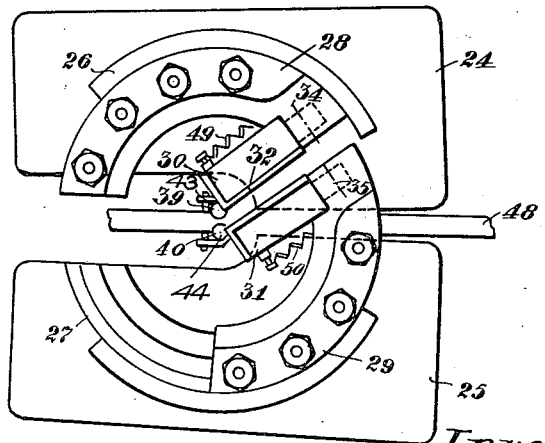
Figure 6:
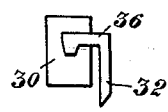

Fig. 6 a side elevation,

Fig. 7 shows the tool heads displaced from the position shown in Fig. 4, and

Figure 8:
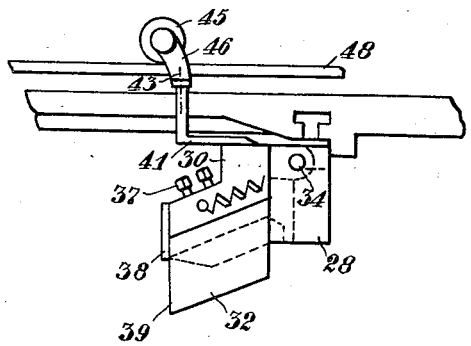

Fig. 8 is a detail.

In Fig. 1, S represents the apex of the bevel wheel A, line 1—2 the stroke of the cutting tool, 3—4 the line of cut and 2—4 is therefore the approach and 1—3 the run out of the cutting tool. In Fig. 2 the surface of the bevel wheel has been developed into a plane. The tool holder is driven, by means of a crank, for example, and the motion of the bevel blank, as also that of the crankpin is uniform. The spiral 5, 6, 7, 8 (in the lower part of Fig. 2) represents the relative movement of the cutting tool to the surface of the work during the cutting stroke, the spiral 8, 9, 10, 11, that during the return. After the tool has returned to its starting point, the work (bevel blank) has rotated the amount of one pitch interval, so that the succeeding tooth will be cut. The advance, that is the distance by which the beginning and end of the helical tooth are offset to one another, amounts to 1/5 of a pitch interval, the mean spiral angle to 2°.

As shown in the upper part of Fig. 2, the bevel wheel set out in the lower part of the figure with for example, twenty five teeth, will be cut in such a manner that the work will have made a rotary advance of seven pitch intervals when the cutting tool has returned to its starting point.

The curve 12, 13, 14, 15 represents the relative movement of the cutting tool to the cone surface during its out-stroke, the curve 15, 16, 17, 18 that during its return. The curve 13, 14 is the furrow made in the bevel blank, the return of the ram takes place with the cutting tool swivelled back.

The "advance" of the cutting tool between two cuts is seven times as great as in the lower part of Fig. 2, because the bevel blank has moved forward seven times faster under the cutting tool during the cut, therefore 7/5 of the pitch interval: the mean spiral angle amounts to about 14°. If the rotation of the bevel blank between two cuts be continued by a number of pitch intervals which is neither contained in the total number of the teeth of the blank to be cut nor has a common measure therewith, then after several revolutions of the bevel wheel all the teeth will be cut, without any supplementary dividing, therefore without the necessity of a dividing mechanism. On the contrary, an automatic dividing without dividing mechanism takes place.

In Fig. 3 the straight lines 1' to 25' represent the teeth of the bevel wheel, while the points situated below show the teeth which are cut at each of the revolutions I, II–VII of the bevel wheel. As the bevel wheel rotates forward seven pitch intervals at each double stroke of the cutting tool, then it will have to make seven revolutions before all the teeth are cut. By the missing of teeth being carried further, teeth with greater angularity can be obtained. It is possible, for instance to rotate the work (bevel blank) so quickly, that the cutting tool will cut into the tooth preceding that just cut.

In order that the back of the prismatic tool will lie within the tooth space, it will be necessary to adjust the tool to the direction of this relative movement, the line of motion of the point of the cutting edge of the tool however, passing through the apex of the cone, as when planing straight teeth.

The apex of the cone of the work is fixed in the machine as to the point of intersection of the pivot, about which the movements for generating the tooth shape takes place. The adjustment of the point of the cutting edge of the tool is thereby also fixed.

The invention also comprises a machine for planing bevel gear wheels with helical teeth which will meet these two requirements in a simple manner by means of the design of the tool head; firstly, adjustment of the tool to any desired angle, and secondly, adjustment of the point of the cutting edge of the tool to the specific constant position. The first requirement, adjustment of the tool to the spiral angle existing at any particular instant is met by the tool holder being rotatably mounted in the tool head. In order to satisfy the second requirement, fixed position of the point of the cutting edge of the tool at all spiral angles, the axis of this rotation is so disposed that it passes through the point which the point of the cutting edge of the tool occupies. The position of the tool in the tool holder will hereby be fixed by means of a gauge during the setting up of the tool. By this arrangement of the tool head, it is possible by means of a single adjustment, that is by rotating the tool holder, to bring the tool into the correct position for another spiral angle, because the point of the cutting edge of the tool does not depart during the rotation of the tool holder, from the position to which it has been once correctly adjusted, as it is situated on the axis of this rotation. Of the axes of rotation which can be made to pass through the point of the cutting edge of the tool, it is preferable to adopt that which is perpendicular to the tangential plane on the root cone of the bevel blank, which is parallel to the line of motion of the tool. The remaining portion of the machine can be arranged in various ways, whether a templet or rolling off machine be employed.

Two slide guides 21, 22 are provided, one for each tool, which for instance in a rolling-off machine will be swivelled by means of toothed segments, while they are coupled to one another by means of a right and left handed screw 23, so that they can be swivelled for cutting teeth of different thicknesses, but remain in the once adjusted position during the operation of the machine. Each slide guide contains a slide 24, 25 respectively, each of which is provided with a circular guide 26, 27 respectively, having closely co-adjacent centers. Capable of being swivelled along these circular guides are jaws 28, 29 upon which the carriers 30, 31 for the tools 32, 33, are mounted, capable of swinging about 34, 35 respectively. The tools are inserted in the tool head from the front by their guide projections 36 (Fig. 6)

and locked by means of set screws 37 and the plate 38 adapted to be secured in front. According to the apparatus so far described, the tools can be so adjusted about imaginary axes 39, 40 perpendicular to the direction of their motion in the slide guides 21, 22, namely in the arcs about the centers of the circular guides 26, 27 that the forward cutting edge of the tool always remains stationary, even if the direction of the tool to the line of motion of the tool head (towards the apex of the bevel blank) be altered, that is to say, the axis of the tool and the line of motion of the tool enclose any angle whatever, as shown for example in Fig. 7.

In order to lift the tool away from the work at the return, arms 41, 42 (Fig. 5) branch off from the tool heads 30, 31 capable of swinging about 34, 35, the said arms being connected, by means of closely juxtaposed vertical pins 43, 44 to the side plates 46, 47 leading to a roller 45. The roller is actuated by a lifting device which for example is constituted by a rail 48 moved regularly backward and forward, upon which the roller 45 travels. In this apparatus the pivot pins 43, 44 as well as the extreme forward edge of the tools, lie exactly or approximately central to the circular guides 26, 27, so that in consequence, the tools 32, 33 or the tool heads 30, 31 can be displaced in the arcs without thereby requiring the lifting device to alter its position. During the working stroke of the tools 32, 33 directed towards the cone apex of the bevel blank, the rail 48 is swung out forwardly and springs 49, 50 thereby pull the tool heads 30, 31 into the working position; on the return of the tools, the rail 48 moves rearwardly, whereby the tool heads 30, 31 will be swivelled rearwardly about 34, 35 and the tools thereby lifted away from the work.

What I claim is:—

1. The method of planing helical teeth, consisting in proportioning the ratio of the number of strokes of the cutting tool to the number of revolutions of the constantly rotating work so that the cutting tool misses a number of pitch intervals.

2. The method of planing helical teeth as claimed in claim 1, wherein the continuously rotating work is rotated forward between two cuts a number of pitch intervals which is not contained in the total number of teeth to be formed on the work and does not have a common measure therewith.

3. In a planing machine for making bevel gear wheels with helical teeth, tool slide guides, tools and tool receiving heads adjustable in a circular arc about an axis perpendicular to their line of motion in such a manner that the direction of the tools to the line of motion of the tool heads may be altered without changing the cutting edges of the tools from their positions substantially centrally of the arc.

4. In a planing machine as claimed in claim 3, mechanism for raising the tools on their return stroke, including a lifting rail, a roller associated therewith and positioned substantially at the center of the displacement of the arc of the tools, and pins suspended from the roller for operable engagement with the tools, substantially as and for the purpose set forth.

In testimony whereof I have signed my name to this specification.

Ing. HEINRICH BRANDENBERGER.